United States Patent
Ghosh et al.

(10) Patent No.: US 9,886,514 B2
(45) Date of Patent: Feb. 6, 2018

(54) SYSTEM AND METHOD FOR CUSTOMIZING SEARCH RESULTS FROM USER'S PERSPECTIVE

(71) Applicant: Apple Inc., Cupertino, CA (US)

(72) Inventors: Rishab Aiyer Ghosh, San Francisco, CA (US); Lun Ted Cui, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/017,517

(22) Filed: Feb. 5, 2016

(65) Prior Publication Data
US 2016/0232248 A1   Aug. 11, 2016

Related U.S. Application Data

(63) Continuation of application No. 13/161,857, filed on Jun. 16, 2011, now Pat. No. 9,280,597, which is a
(Continued)

(51) Int. Cl.
*G06F 17/30* (2006.01)

(52) U.S. Cl.
CPC .... *G06F 17/30867* (2013.01); *G06F 17/3053* (2013.01); *G06F 17/30067* (2013.01);
(Continued)

(58) Field of Classification Search
CPC ................ G06F 17/30728; G06F 17/30864
(Continued)

(56) References Cited

U.S. PATENT DOCUMENTS 6,151,585 A   11/2000   Altschuler et al.
6,286,005 B1   9/2001   Cannon
(Continued)

FOREIGN PATENT DOCUMENTS

JP   2003288437 A   10/2003
WO   WO-2006073977 A1   7/2006
(Continued)

OTHER PUBLICATIONS

Guha, R., Kumar, R., Raghavan, P., and Tomkins, A, 2004. Propagation of trust and distrust. In Proceedings of the 13th International Conference on World Wide Web (New York, NY, USA, May 17-20, 2004) WWW '04. ACM, New York, NY. pp. 403-412.
(Continued)

*Primary Examiner* — Shahid Alam
(74) *Attorney, Agent, or Firm* — Blakely, Sokoloff, Taylor & Zafman LLP (57) ABSTRACT

A new approach is proposed that contemplates systems and methods to generate customized subjective search results from the perspective of a user who conducts the search or any other subject entity of chosen by the user. A scored subject list is created from the user's network of sources/subjects/contacts, where each element on the list is a subject/source and the score reflects the subject's potential influence or closeness of its connection/relation with the user. Once created, the subject list is then used as a bias filter on the list of citations from search results. With such influence-weighted citation scores, objects and/or subjects from citations of subjects that have big influence on or enjoy high respect from the user will be ranked prominently in the search result presented to the user, thus biasing the search results from the user's perspective.

18 Claims, 4 Drawing Sheets

Related U.S. Application Data continuation-in-part of application No. 12/895,593, filed on Sep. 30, 2010, now Pat. No. 7,991,725, and a continuation-in-part of application No. 12/628,791, filed on Dec. 1, 2009, now Pat. No. 8,688,701, and a continuation-in-part of application No. 12/628,801, filed on Dec. 1, 2009, now Pat. No. 8,244,664.

(60) Provisional application No. 61/355,912, filed on Jun. 17, 2010, provisional application No. 61/355,937, filed on Jun. 17, 2010.

(52) U.S. Cl.
CPC .. *G06F 17/30477* (2013.01); *G06F 17/30728* (2013.01); *G06F 17/30864* (2013.01); *G06F 17/30991* (2013.01)

(58) Field of Classification Search
USPC .......................................................... 707/706
See application file for complete search history.

(56) References Cited

U.S. PATENT DOCUMENTS

| | | |
|---|---|---|
| 7,512,612 B1 | 3/2009 | Akella et al. |
| 7,636,714 B1 | 12/2009 | Lamping et al. |
| 7,885,844 B1 | 2/2011 | Cohen et al. |
| 8,086,605 B2 | 12/2011 | Xu et al. |
| 8,166,026 B1 | 4/2012 | Sadler |
| 8,166,925 B2 | 4/2012 | Suggett |
| 8,352,549 B2 | 1/2013 | Sacco et al. |
| 8,572,173 B2 | 10/2013 | Briere et al. |
| 2003/0110056 A1 | 6/2003 | Berghofer et al. |
| 2003/0229531 A1 | 12/2003 | Heckerman et al. |
| 2004/0225592 A1 | 11/2004 | Churquina |
| 2005/0060312 A1 | 3/2005 | Curtiss et al. |
| 2005/0131897 A1 | 6/2005 | Grasso et al. |
| 2005/0154690 A1 | 7/2005 | Nitta et al. |
| 2005/0192957 A1 | 9/2005 | Newbold |
| 2005/0256866 A1 | 11/2005 | Lu et al. |
| 2006/0041543 A1 | 2/2006 | Achlioptas |
| 2006/0059055 A1 | 3/2006 | Lin |
| 2006/0074836 A1 | 4/2006 | Gardner et al. |
| 2006/0112111 A1 | 5/2006 | Tseng et al. |
| 2006/0112146 A1 | 5/2006 | Song et al. |
| 2006/0218577 A1 | 9/2006 | Goodman et al. |
| 2006/0248073 A1 | 11/2006 | Jones et al. |
| 2006/0294085 A1 | 12/2006 | Rose et al. |
| 2006/0294086 A1 | 12/2006 | Rose et al. |
| 2006/0294134 A1 | 12/2006 | Berkhim et al. |
| 2007/0011155 A1 | 1/2007 | Sarkar |
| 2007/0027744 A1 | 2/2007 | Carson et al. |
| 2007/0078699 A1 | 5/2007 | Scott et al. |
| 2007/0112761 A1 | 5/2007 | Xu et al. |
| 2007/0121843 A1 | 5/2007 | Atazky et al. |
| 2007/0124432 A1 | 5/2007 | Holtzman et al. |
| 2007/0150396 A1 | 6/2007 | Rossen et al. |
| 2007/0156636 A1 | 7/2007 | Norton et al. |
| 2007/0156747 A1 | 7/2007 | Samuelson |
| 2007/0168531 A1 | 7/2007 | Canright et al. |
| 2007/0208613 A1 | 9/2007 | Backer |
| 2007/0214097 A1 | 9/2007 | Parsons et al. |
| 2007/0219863 A1 | 9/2007 | Park et al. |
| 2007/0226248 A1 | 9/2007 | Darr |
| 2007/0282867 A1 | 12/2007 | Mcallister et al. |
| 2007/0297405 A1 | 12/2007 | He |
| 2008/0004942 A1 | 1/2008 | Calabria |
| 2008/0010253 A1 | 1/2008 | Sidhu et al. |
| 2008/0059466 A1 | 3/2008 | Luo et al. |
| 2008/0104225 A1 | 5/2008 | Zhang et al. |
| 2008/0133426 A1 | 6/2008 | Porat et al. |
| 2008/0208911 A1 | 8/2008 | Lee et al. |
| 2008/0215429 A1 | 9/2008 | Ramer et al. |
| 2008/0215557 A1 | 9/2008 | Ramer et al. |
| 2008/0215571 A1 | 9/2008 | Huang et al. |
| 2008/0275833 A1 | 11/2008 | Zhou et al. |
| 2008/0288305 A1 | 11/2008 | LaLuzerne et al. |
| 2008/0288596 A1 | 11/2008 | Smith et al. |
| 2008/0313011 A1 | 12/2008 | Rose et al. |
| 2009/0006388 A1 | 1/2009 | Ives et al. |
| 2009/0049038 A1 | 2/2009 | Gross |
| 2009/0049308 A1 | 2/2009 | Gross |
| 2009/0106224 A1 | 4/2009 | Roulland et al. |
| 2009/0106244 A1 | 4/2009 | Dash et al. |
| 2009/0119173 A1 | 5/2009 | Parsons et al. |
| 2009/0157490 A1 | 9/2009 | Lawyer |
| 2009/0234828 A1 | 9/2009 | Tu |
| 2009/0240647 A1 | 9/2009 | Green et al. |
| 2009/0276500 A1 | 11/2009 | Karmarkar |
| 2009/0319342 A1 | 12/2009 | Shilman et al. |
| 2010/0058196 A1 | 3/2010 | Krishnan et al. |
| 2010/0070448 A1 | 3/2010 | Omoigui |
| 2010/0070485 A1 | 3/2010 | Parsons et al. |
| 2010/0100537 A1 | 4/2010 | Druzgalski et al. |
| 2010/0119053 A1 | 5/2010 | Goeldi |
| 2010/0121817 A1 | 5/2010 | Meyer |
| 2010/0121839 A1 | 5/2010 | Meyer |
| 2010/0174692 A1 | 7/2010 | Meyer |
| 2010/0306192 A1 | 12/2010 | Kapur et al. |
| 2011/0004465 A1 | 1/2011 | Rose et al. |
| 2011/0022602 A1 | 1/2011 | Luo et al. |
| 2011/0078156 A1 | 3/2011 | Koss |
| 2011/0093459 A1 | 4/2011 | Dong et al. |
| 2011/0191372 A1 | 8/2011 | Kaushansky et al. |
| 2011/0212717 A1 | 9/2011 | Rhoads et al. |
| 2012/0166438 A1 | 6/2012 | Wu et al. |

FOREIGN PATENT DOCUMENTS

| | | |
|---|---|---|
| WO | WO2006/116516 A2 | 11/2006 |
| WO | WO2008/006059 A2 | 1/2008 |

OTHER PUBLICATIONS

Ziegler, C. and Lausen, G. 2005. Propagation Models for Trust and Distrust in Social Networks. Information Systems Frontiers 7, 4-5 (Dec. 2005), 337-358.

Teo, Yufei et al: "Selectivity Estimation of Predictive Spatio-Temporal Queries". Proceedings 19th International Conference on Date Engineering (ICDE'2003). Bangladore, India, Mar. 5-8, 2003; pp. 417-428.

Dai, Na et al: "Mining Anchor Text Trends for Retrieval" Mar. 28, 2010: pp. 127-139.

Ashkan, Azin et al: "Classifying and Characterizing Query Intent", Apr. 6, 2009, pp. 578-586.

Garfield, E.: "Citation Analysis as a Tool in Journal Evaluation", 1972, pp. 527-544, XP002361248.

Johnson, Caleb: "Likebutton.me Reveals When Your Friends 'Like' Across the Web"; Apr. 26, 2010, pp. 1-7; XP000002656471.

Anonymous: "H-index", Wikipedia, Internet Article, Jun. 10, 2010; pp. 1-3; XP0000D2656472.

Dietz, Laura et al: "Unsupervised Prediction of Citation Influences", Proceedings of the 24th International Conference on Machine Learning. Jun. 20, 2007; pp. 233-240; XP55004362.

Huang, Jeff et al: "Conversational Tagging in Twitter", Proceedings of the 21st ACM Conference on Hypertext and Hypermedia; Jun. 13, 2010: p. 173; XP55004358.

Page, L. et al: "The PageRank Citation Ranking: Bringing Order to the Web", Internet Citation; Jan. 29, 1998; XP002213518.

Masse, Paolo et al: "Using Trust in Recommender Systems: An Experimental Analysis"; Feb. 26, 2004; pp. 221-235, section 1.1; pp. 222-223, sections 1.3 and 2; pp. 225-227.

Liu, "Co-authorship networks in the digital library research community", 2005, Elsevier, Information Processing and Management 41 (2005) pp. 1462-1480.

Von Der Weth, "Towards an objective assessment of centrality measures in reputation systems", 2007, IEEE, 0-7695-2913.

Zhou, "Powertrust: A robust and scalable reputation system for trusted peer-to-peer computing", 2007, IEEE, 1-45-921907.

(56) References Cited

OTHER PUBLICATIONS

Lu et al., "Finding Query Suggestions for PubMed", 2009, AMIA.
Makkonen et al., Topic Detection and Tracking with Spatio-Temporal Evidence, published Spring 2003.
Fan, et al., "Suggesting Topic-Based Query Terms as Your Type", 2010 12th International Asia-Pacific Web Conference (Apr. 2010).
PCT International Search Report for PCT/US2011/040840 dated Sep. 22, 2011.
PCT Written Opinion of the International Searching Authority for PCT/US2011/040840 dated Sep. 22, 2011.
PCT International Preliminary Report on Patentabiiity for PCT/US2011/040840 dated Dec. 19, 2012.

Set and adjust citation searching, retrieving and ranking criteria and mechanisms based on user specification and/or internal statistical data
402

Retrieve a plurality of citations of objects that fit the search criteria
404

Create a list of subjects from a user's perspective and calculate the influence scores of the subjects on the user
406

Rank subjects of the plurality of citations from the user's perspective using the list of subjects as a bias filter
408

Select subjects as the search result for the user based on the influence scores and/or the relative expertise of the citing subjects
410

FIG. 4

SYSTEM AND METHOD FOR CUSTOMIZING SEARCH RESULTS FROM USER'S PERSPECTIVE

RELATED APPLICATIONS

This application is a continuation of co-pending U.S. application Ser. No. 13/161,857 filed on Jun. 16, 2011 which claims priority to U.S. Provisional Patent Application No. 61/355,912, filed Jun. 17, 2010, and entitled "A system and method for customizing search results from user's perspective," and is hereby incorporated herein by reference. This application is a continuation of co-pending U.S. application Ser. No. 13/161,857 filed on Jun. 16, 2011 which is a continuation-in-part of prior U.S. application Ser. No. 12/895,593 filed on Sep. 30, 2010, now issued as U.S. Pat. No. 7,991,725 . This application is a continuation of co-pending U.S. application Ser. No. 13/161,857 filed on Jun. 16, 2011 which is also a continuation-in-part of U.S. application Ser. No. 12/628,791 filed on Dec. 1, 2009, now issued as U.S. Pat. No. 8,688,701 and a continuation-in-part of U.S. application Ser. No. 12/628,801 filed on Dec. 1, 2009, now issued as U.S. Pat. No. 8,244,664.

This application is a continuation of co-pending U.S. application Ser. No. 13/161,857 filed on Jun. 16, 2011 which claims priority to U.S. Provisional Patent Application No. 61/355,937, filed Jun. 17, 2010, and entitled "A system and method for people search based on relative expertise from user's perspective," and is hereby incorporated herein by reference.

BACKGROUND

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities/ Although there are various tools (e.g., search engines, community boards with various ratings), there lacks any indicia of personal trustworthiness (e.g., measure of the source's reputation and/or influence) with located data.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the influence of the source of data (e.g., referral). With current practices, the entity seeking the data must make a value judgment on the influence of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity. Influence accrued by persons in such a network of references is subjective in other words, influence accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

As referred to herein, influence is provided for augmenting reputation, which may be subjective. In some embodiments, influence is provided as an objective measure. For example, influence can be useful in filtering opinions, information, and data. It will be appreciated that reputation and influence provide unique advantages in accordance with some embodiments for the ranking of individuals or products or services of any type in any means or form.

Another issue facing an online user is the difficulty to search for content that actually addresses his/her problem from his/her own perspective or from someone whose opinion the user values highly. Even when the user is able to find the content that is relevant to address his/her problem, such content is most likely to be of "one size fits all" type that addresses concerns of the general public while does not target at the specific need of the user as an individual. Although some online vendors do keep track of web surfing and/or purchasing history or tendency of a user online for the purpose of recommending services and products to the user based on such information, such online footprint of the user is only passively gathered or monitored, which often does not truly reflect the user's real intention or interest. Therefore, there is a need for search results customization from a user's perspective.

In addition, the user may not be able to recognize whether the content is from a creditable source or what the experts think of R. Therefore, there is a need to identify sources of relative expertise in the field of the user's interest and from the user's perspective.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to generate customized subjective search results from the perspective of a user who conducts the search or any other subject entity of chosen by the user. More specifically, to provide the search results from the perspective of a given user, the user's network of sources/subjects/contacts up to a given number of degrees/levels/depth is flattened into a scored subject list, where each element on the list is a subject/source (e.g., "user" or "author") and the score reflects the subject's potential influence or closeness of its connection/relation with the user, Once created, the subject list is then used as a bias filter on the list of citations from search results, where each citation describes, for a non-limiting example, an opinion by a subject on a target or object matching the query terms in the search result. The objects and/or subjects appearing in search result are then ranked based on a ranking function that takes into consideration the perspective influence scores of the subjects of each matching citation on the user, where the perspective influence scores can be obtained from the user's subject list for those citing subjects that are on the list. If a subject of a matching citation does not appear on the user's subject list, a low score will be assigned to the citation during ranking. With such influence-weighted citation scores, objects and/or subjects from citations of subjects that have big influence on or enjoy high respect from the user will be ranked prominently in the search result presented to the user, thus biasing the search results from the user's perspective. Consequently, a search with identical terms may yield different search results for different users.

Citation Graph

Figure 1:
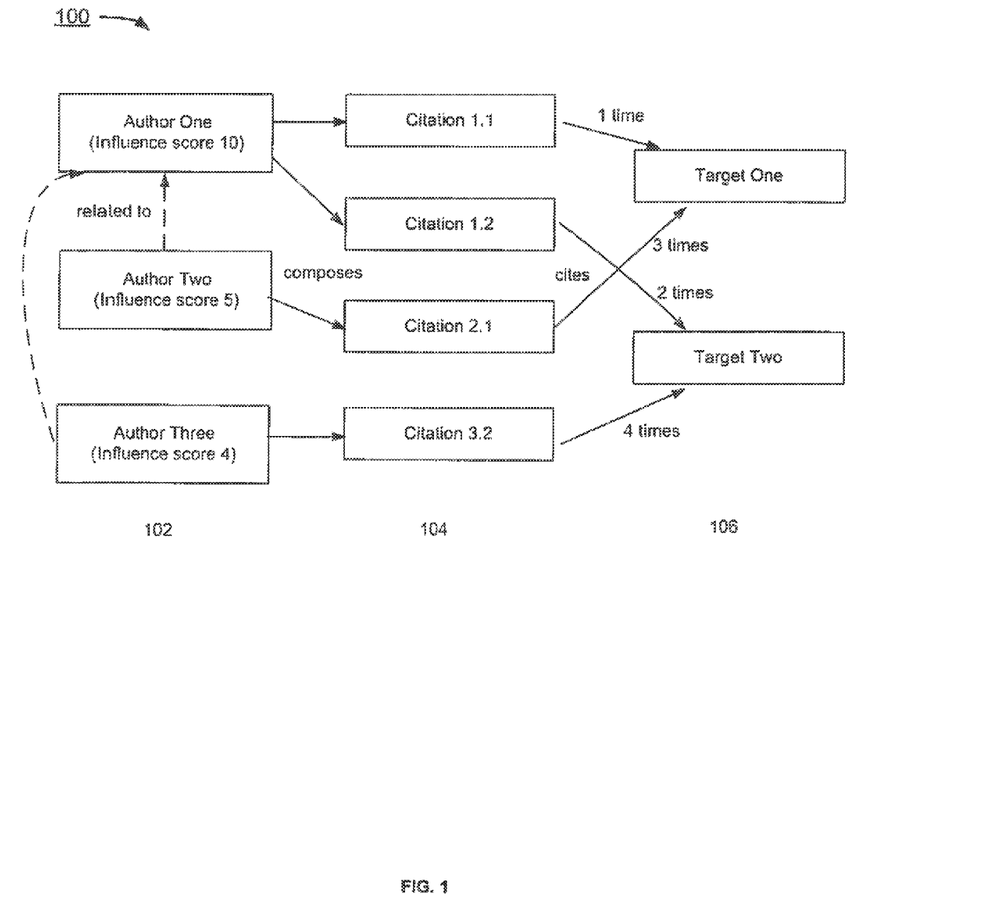
FIG. 1 depicts an example of a citation graph used to support citation search.

An illustrative implementation of systems and methods described herein in accordance with some embodiments includes a citation graph 100 as shown in FIG. 1. In the example of FIG. 1, the citation graph 100 comprises a plurality of citations 104, each describing an opinion of the object by a source/subject 102. The nodes/entities in the citation graph 100 are characterized into two categories, 1) subjects 102 capable of having an opinion or creating/making citations 104, in which expression of such opinion is explicit, expressed, implicit, or imputed through any other technique; and 2) objects 106 cited by citations 104, about which subjects 102 have opinions or make citation& Each subject 102 or object 106 in graph 100 represents an influential entity, once an influence score for that node has been determined or estimated. More specifically, each subject 102 may have an influence score indicating the degree to which the subject's opinion influences other subjects and/or a community of subjects, and each object 106 may have an influence score indicating the collective opinions of the plurality of subjects 102 citing the object.

In some embodiments, subjects 102 representing any entities or sources that make citations may correspond to one or more of the following: As discussed hereinafter, each source or subject can be but is not limited to an internet author or user of social media services.

Representations of a person, web log, and entities representing Internet authors or users of social media services including one or more of the following: blogs, Twitter, or reviews on Internet web sites;

Users of microblogging services such as Twitter;

Users of social networks such as MySpace or Facebook, bloggers;

Reviewers, who provide expressions of opinion, reviews, or other information useful for the estimation of influence.

In some embodiments, objects 108 cited by the citations 104 may correspond to one or more of the following: Internet web sites, blogs, videos, books, films, music, image, video, documents, data files, objects for sale, objects that are reviewed or recommended or cited, subjects/authors, natural or legal persons, citations, or any entities that are or may be associated with a Uniform Resource Identifier (URI), or any form of product or service or information of any means or form for which a representation has been made.

In some embodiments, the links or edges 104 of the citation graph 100 represent different forms of association between the subject nodes 102 and the object nodes 106, such as citations 104 of objects 106 by subjects 102. For non-limiting examples, citations 104 can be created by authors citing targets at some point of time and can be one of link, description, keyword or phrase by a source/subject 102 pointing to a target (subject 102 or object 106). Here, citations may include one or more of the expression of opinions on objects, expressions of authors in the form of Tweets, blog posts, reviews of objects on Internet web sites Wikipedia entries, postings to social media such as Twitter or Jaiku, postings to websites, postings in the form of reviews, recommendations, or any other form of citation made to mailing lists, newsgroups, discussion forums, comments to websites or any other form of Internet publication.

In some embodiments, citations 104 can be made by one subject 102 regarding an object 106, such as a recommendation of a website, or a restaurant review, and can be treated as representation an expression of opinion or description. In some embodiments, citations 104 can be made by one subject 102 regarding another subject 102, such as a recommendation of one author by another, and can be treated as representing an expression of trustworthiness. In some embodiments, citations 104 can be made by certain object 106 regarding other objects, wherein the object 106 is also a subject.

In some embodiments, citation 104 can be described in the format of (subject, citation description, object, timestamp, type). Citations 104 can be categorized into various types based on the characteristics of subjects/authors 102, objects/targets 106 and citations 104 themselves. Citations 104 can also reference other citations. The reference relationship among citations is one of the data sources for discovering influence network.

Figure 2:
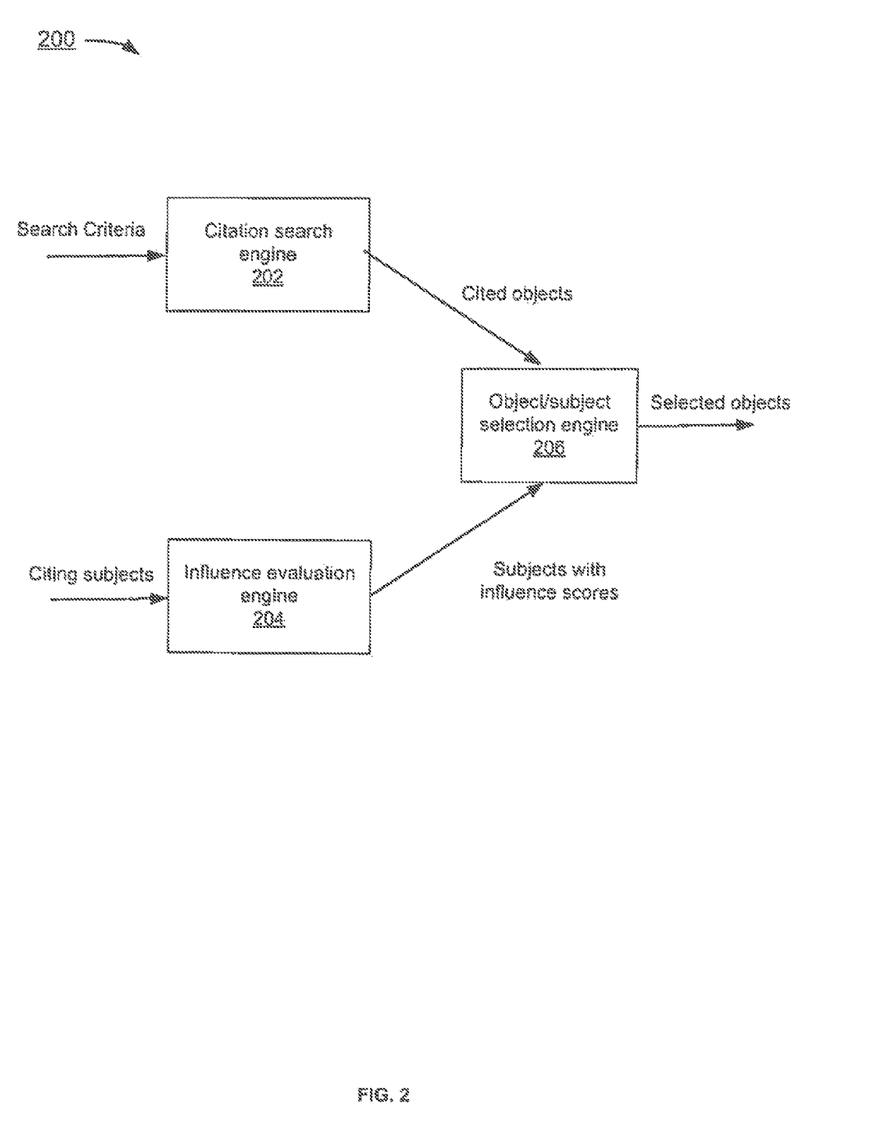
FIG. 2 depicts an example of a system diagram to support customizing search results from user's perspective.

FIG. 2 depicts an example of a system diagram to support customizing search results from user's perspective. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system 200 includes at least citation search engine 202, influence evaluation engine 204, and object/subject selection engine 206. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 2, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, iPad, Google's Android device, a PDA, or a server machine. A storage device can be but is not limited to a hard disk drive, a flash memory drive, or any portable storage device. A communication device can be but is not limited to a mobile phone.

In the example of FIG. 2, citation search engine 202, influence evaluation engine 204, and object/subject selection engine 206 each has a communication Interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

Citation Search

In the example of FIG. 2, citation search engine 202 enables a citation search process, which unlike the "classical web search" approaches that is object/target-centric and focuses only on the relevance of the objects 106 to the searching criteria, the search process adopted by citation search engine 202 is "citation" centric, focusing on influence of the citing subjects 102 that cite the objects. Ire addition, the classical web search retrieves and ranks objects 108 based on attributes of the objects, while the proposed search approach adds citation 104 and subject/author 102 dimensions. The extra metadata associated with subjects 102, citations 104, and objects 106 provide better ranking capability, richer functionality and higher efficiency for the searches.

In some embodiments, the citation search/query request processed by citation search engine 202 may accept and enforce various criteria/terms on citation searching, retrieving and ranking, each of which can either be explicitly described by a user or best guessed by the system based on internal statistical data. Such criteria include but are not limited to, a) Constraints for the citations, including but are not limited to,
  Description: usually the text search query;
  Time range of the citations;
  Author: such as from particular author or sub set of authors;
  Type: types of citations;
b) Types of the cited objects: the output can be objects, authors or citations of the types including but are not limited to,
  Target types: such as web pages, images, videos, people
  Author types: such as expert for certain topic
  Citation types: such as tweets, comments, blog entries
c) Ranking bias of the cited objects: which can be smartly guessed by the system or specified by user including but are not limited to,
  Time bias: recent; point of time; event; general knowledge; auto
  View point bias: such as general view or perspective of certain people.
  Type bias: topic type, target type.

Influence Evaluation in the example of FIG. 2, influence evaluation engine 204 calculates influence scores of entities (subjects 102 and/or objects 106), wherein such influence scores can be used to determine at least in part, in combination with other methods and systems, the ranking of any subset of objects 106 obtained from a plurality of citations 104 from citation search results.

In some embodiments, some subjects/authors 102 who create the citations 104 can be related to each other, for a non-limiting example, via an influence network or community. The influence network of a user includes subjects that are connected to the user either directly or indirectly through other sources (e, g, friend's friends). In some embodiments, influence evaluation engine 204 constructs a scored subject list of a user by flattening the user's influence network of sources/subjects/contacts up to a given number of degrees/levels/depth, where each item on the list is a subject/source. The influence evaluation engine 204 assigns a score to each of the subjects on the list to reflect the subject's potential influence on the user and/or the closeness of its connection with the user.

In some embodiments, the influence network of a user can be private, which is only accessible by the user once he/she authenticates him/herself to the system. No other party may obtain search results from a user's perspective if the user keeps his/her network private.

In some embodiments, the influence network of a user can be open to public, such as a user's connections visible on social networking sites of Facebook and My pace. Consequently, any interested party may get access to the user's influence network of connections in order to obtain search results from that user's perspective instead of his/her own. For a non-limiting example, a user may look at the same issue from the perspectives of different parties whose opinions the user trusts or values highly.

In some embodiments, influence evaluation engine 204 calculates the influence score of a subject based on the one or more of:

Influence of the subject on and/or respect from the user;

The number and length of paths from the subject to the user in the influence network, where the user can be directly or indirectly linked to the subjects on any number of paths comprising of one or more links. Here, a path between a user and a subject may include a direct or an indirect link from the user to an intermediate entity, prefixed to a direct or an indirect path from the intermediate entity to the subject within a predefined maximum length.

In some embodiments, the influence evaluation engine 204 may calculate the influence score of the subject on the user as the influence-weighted sum of the number of the paths from the subject to the user, wherein the weight of each path may be inversely adjusted by the length of the path. For a non-limiting example, if there are two paths from the subject of user-specific influence of 6 to the user with lengths of 2 and 3, respectively, the influence score of the subject on the user can be calculated as $6*(½+⅓)=5$.

In some embodiments, influence evaluation engine 204 measures influence and reputation of subjects 102 that compose the plurality of citations 104 citing the plurality of objects 106 on dimensions that are related to, for non-limiting examples, one or more of the specific topic or objects (e.g., automobiles or restaurants) cited by the subjects, or form of citations (e.g., a weblog or Wikipedia entry or news article or Twitter feed), or search terms (e.g., key words or phrases specified in order to define a subset of all entities that match the search term(s)), in which a subset of the ranked entities are made available based on selection criteria, such as the rank, date or time, or geography/location associated with the entity, and/or any other selection criteria.

In some embodiments, influence evaluation engine 204 determines an influence score for a first subject or source at least partly based on how often a first subject is cited or referenced by a (another) second subject(s). Here, each of the first or the second subject can be but is not limited to an Internet author or user of social media services, while each citation describes reference by the second subject to a citation of an object by the first subject. The number of the citations or the citation score of the first subject by the second subjects is computed and the influence of the second subjects citing the first subject can also be optionally taken into account in the citation score. For a non-limiting example, the influence score of the first subject is computed as a function of some or all of: the number of citations of the first subject by second subjects, a score for each such citation, and the influence score of the second subjects. Once computed, the influence of the first subject as reflected by the count of citations or citation score of the first subject or subject can be displayed to the user at a location associated with the first subject, such as the "profile page" of the first subject, together with a list of the second subjects citing the first subjects, which can be optionally ranked by the influences of the second subject.

In some embodiments, influence evaluation engine 204 optimizes the estimation of influence for different contexts and requirements of performance, memory, graph topology, number of entities, and/or any other context and/or requirement, by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation(s).

In some embodiments, influence evaluation engine 204 computes "relative expertise" of a subject as a measure of the subject's expertise in a topic relative to a larger population of multiple sources and subjects. Here, the relative expertise of the subject is a function of the share of the subject's citations matching the query term relative to the share of all subjects' citations matching the query term, weighted by the influence of subjects. This allows the identification of "experts" on "topics" without any pre-defined categorization of topics or pre-computation of expertise, enabling determination of expertise on any query term in real-time.

In some embodiments, influence evaluation engine 204 may adopt a semantic graph of related terms, which allows the "match to query term" used for computing the relative expertise of the subject to be broader than a match of the query term itself. With such a semantic graph, influence evaluation engine 204 regards a match to a query term have been made, possibly with a different match score, if a match is made for other terms in the semantic graph that are close to the query term. for a non-limiting example, "ibuprofen" and "terfenadine" may both match "medicine" and each other via the semantic graph, so if the query term is "ibuprofen," citations matching "medicine" or "terfenadine" can be considered along with citations matching the query term "ibuprofen" itself.

Object Ranking and Selection

In the example of FIG. 2, object/subject selection engine 206 utilizes influence scores of the citing subjects 102 on the scored subject list of the user and the number of their citations 104 to determine the ranking and selection of objects 106 from the user's perspective, in combination with other ranking criteria that include but are not limited to, influence scores of the citing subjects, date or time, geographical location associated with the objects, and/or any other selection criteria. More specifically, object/subject selection engine 206 ranks the objects appearing in the search result based on a ranking function that takes into consideration the perspective influence scores of the subjects of each matching citation, where the perspective influence scores can be obtained from the user's subject list for those citing subjects that are on the list. If a subject of a matching citation does not appear on the user's subject list, however, object/subject selection engine 208 assigns a low score to the citation during ranking.

Figure 3:
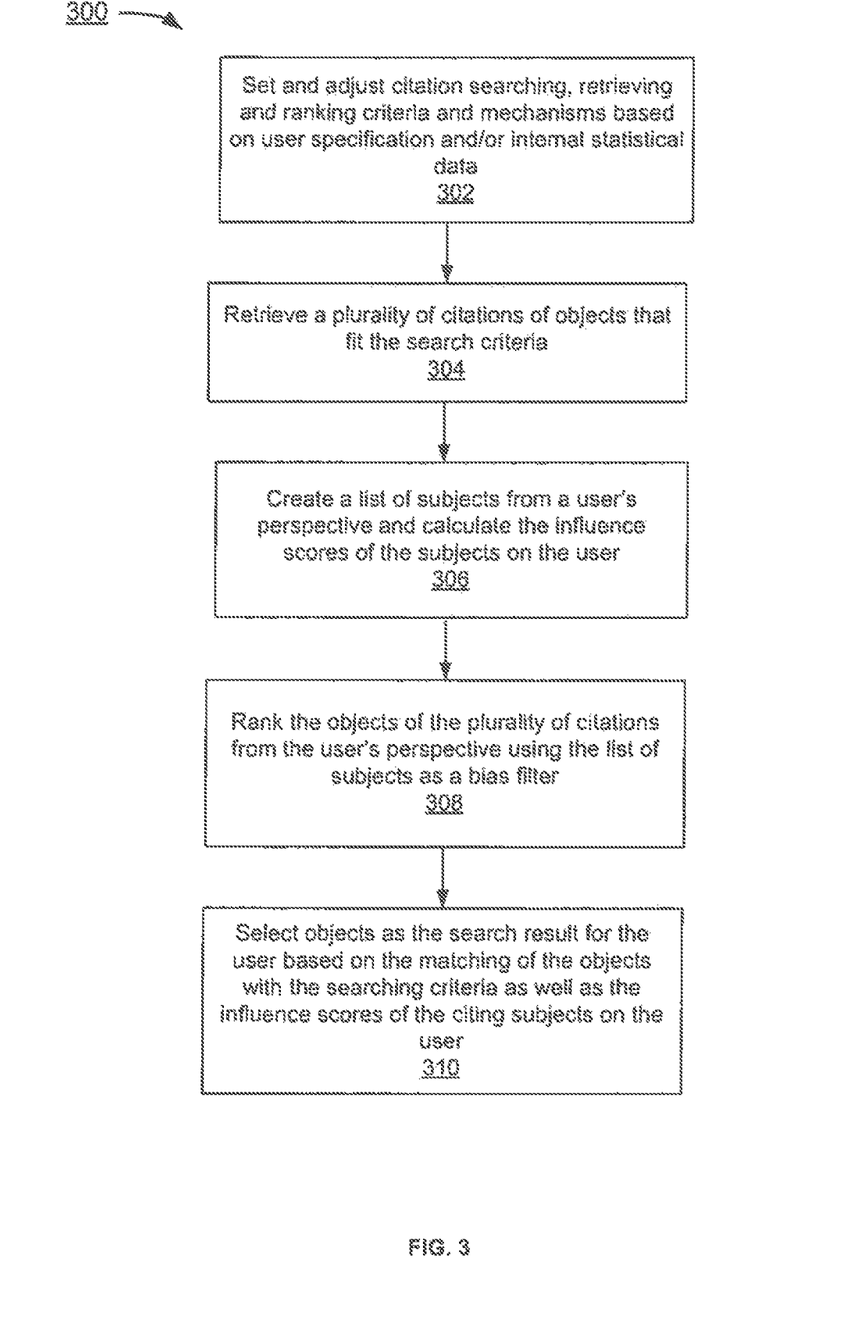
FIG. 3 depicts an example of a flowchart of a process to support customizing search results of cited objects from user's perspective.

FIG. 3 depicts an example of a flowchart of a process to support customizing search results of cited objects from user's perspective. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where citation searching, retrieving and ranking criteria and mechanisms are set and adjusted based on user specification and/or internal statistical data. The flowchart 300 continues to block 304 where a plurality of citations of objects that fit the search criteria, such as text match, time filter, author filter, type filter, are retrieved. The flowchart 300 continues to block 306 where a list of subjects is created from a user's perspective and the influence scores of the subjects on the user are calculated. The flowchart 300 continues to block 306 where the list of subjects is used as a bias filter to rank the objects of the plurality of citations from the user's perspective. The flowchart 300 ends at block 310 where objects are selected as the search result for the user based on the matching of the objects with the searching criteria as well as the influence scores of the citing subjects on the user.

In some embodiments, object/subject selection engine 206 determines the qualities of the cited objects by examining the distribution of influence scores of subjects citing the objects in the search results. For a non-limiting example, one measure of the influence distribution is the ratio of the number of citations from the "influential" and the "non-influential" subjects, where "influential" subjects may, for a non-limiting example, have an influence score higher than a threshold determined by the percentile distribution of all influence scores. Object/subject selection engine 206 accepts only those objects that show up in the citation search results if their citation ratios from "influential" and "non-influential" subjects are above a certain threshold while others can be marked as spam if the ratio of their citation ratios from "influential" and "non-influential" subjects fall below the certain threshold, indicating that they are most likely cited from spam subjects.

In some embodiments, object/subject selection engine 206 calculates and ranks cited objects by treating citations of the objects as connections having positive or negative weights in a weighted citation graph. A citation with implicit positive weight can include, for a non-limiting example, a retweet or a link between individual blog posts or web cites, while a citation with negative weight can include, for a non-limiting example, a statement by one subject 102 that another source is a spammer.

In some embodiments, object/subject selection engine 206 uses citations with negative weights in a citation graph-based rank/influence calculation approach to propagate negative citation scores through the citation graph. Assigning and propagating citations of negative weights makes it possible to identify clusters of spammers in the citation graph without having each spammer individually identified. Furthermore, identifying subjects/sources 102 with high influence and propagating a few negative citations from such subjects is enough to mark an entire cluster of spammers negatively, thus reducing their influence on the search result.

In some embodiments, object/subject selection engine 206 presents the generated search results of cited objects to a user who issues the search request or provides the generated search results to a third party for further processing. In some embodiments, object/subject selection engine 206 presents to the user a score computed from a function combining the count of citations and the influence of the subjects of the citations along with the search result of the objects. In some embodiments, object/subject selection engine 206 displays multiple scores computed from functions combining the counts of subsets of citations and the influence of the source of each citation along with the search result, where each subset may be determined by criteria such as the influence of the subjects, or attributes of the subjects or the citations. For non limiting-examples, the following may be displayed to the user—"5 citations from Twitter; 7 citations from people in Japan; and 8 citations in English from influential users." The subsets above may be selected and/or filtered either by the object/subject selection engine 206 or by users.

In some embodiments, object/subject selection engine 206 selects for display of every object in the search result, one or more citations and the subjects of the citations on the basis of criteria such as the recency or the influence of their citing subjects relative to the other citations in the search result. Object/subject selection engine 206 then displays the selected citations and/or subjects in such a way that the relationship between the search result, the citations and the subjects of the citations are made transparent to a user.

Subject Ranking and Selection

In the example of FIG. 2, object/subject selection engine 206 may alternatively utilize the scored subject list of a user for the ranking and selection of subjects 102 instead of objects 106 from the perspective of the user who conducts the search or any other subject entity, including, in a non-limiting example, any subject entity chosen by the user to provide "people search" or "expert search" functionality. Here, for "people/expert search", the search results for a query are the subjects of citations matching the query, rather than objects of the citations, weighted by among other factors the relative expertise of the subjects. As discussed above, the relative expertise reflects the subject's interest or expertise in a certain topic or subject, thus making the subject eligible as a candidate in the people search for experts.

Figure 4:
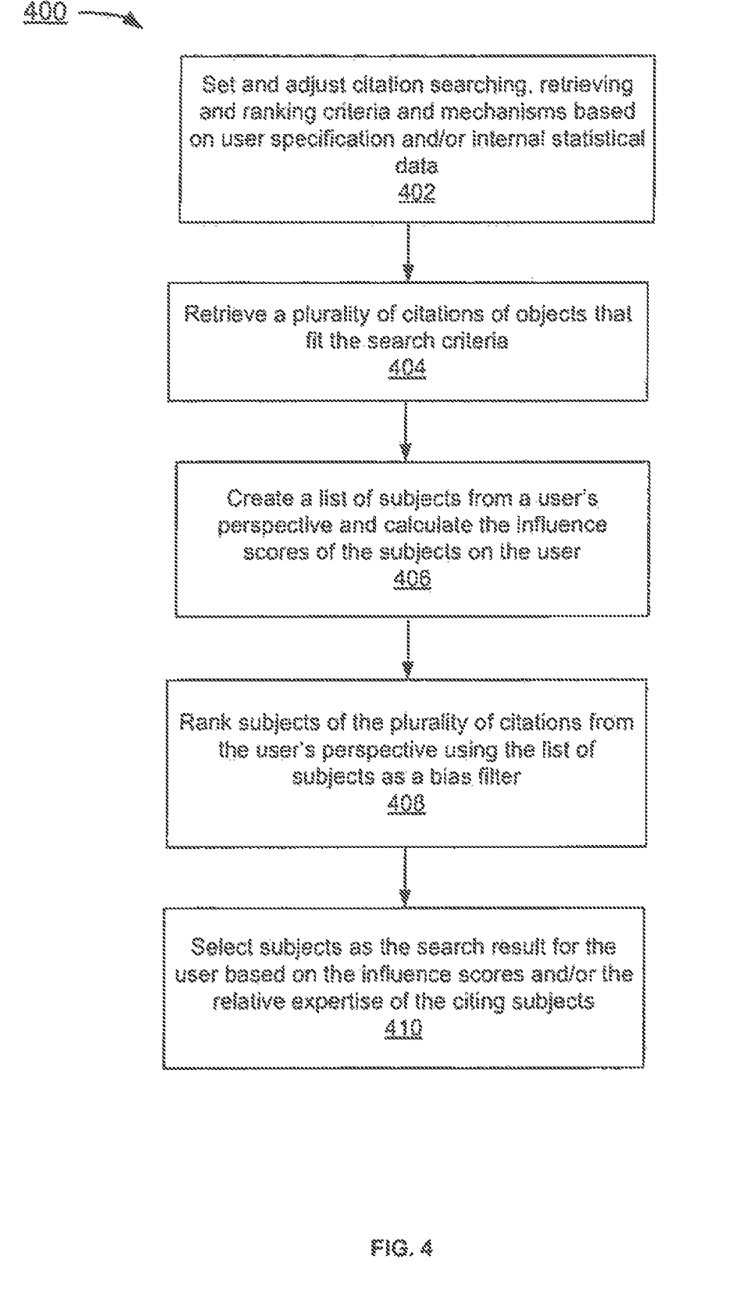
FIG. 4 depicts an example of a flowchart of a process to support customizing search results of citing subjects from user's perspective.

FIG. 4 depicts an example of a flowchart of a process to support customizing search results of citing subjects from user's perspective. In the example of FIG. 4, the flowchart 400 starts at block 402 where citation searching, retrieving and ranking criteria and mechanisms are set and adjusted based on user specification and/or internal statistical data. The flowchart 400 continues to block 404 where a plurality of citations of objects that fit the search criteria is retrieved. Here, the citations from the search result are, in one non-limiting example, the list of such citations that match the query terms for the search.

The flowchart 400 continues to block 406 where a list of subjects is created from the user's perspective and the influence scores of the subjects on the user are calculated. In some embodiments, influence evaluation engine 204 may construct the scored subject list of the user by flattening the user's network of sources/subjects/contacts up to a given number of degrees/levels/depth, where each item on the list is a subject/source (e.g., "user"/"author") and the score reflects the subject's potential influence or "closeness" of its connection/relation with the user. The influence evaluation engine 204 may calculate the "closeness" score based on the number and length of paths in a network from the user to that subject.

The flowchart 400 continues to block 408 where the list of subjects is used as a bias filter to rank the subjects of the plurality of citations from the user's perspective. In some embodiments, object/subject selection engine 206 may remove citations from subjects outside the user's subject list from the search result or ranked such citations lower in the search result. More specifically, object/subject selection engine 206 may rank the subjects appearing in the search result based on a ranking function that takes into consideration the above described perspective "closeness" scores of the subjects of each matching citation on the user, as well as the "relative expertise" score of the subjects in the result. If a subject in the search result does not appear on the user's subject list, object/subject selection engine 208 may assign a lower score to the citations from the subject, and therefore to the subject itself, during ranking. With such closeness— and relative-expertise—weighted citation scores, subject that have a high degree of closeness to the user and a high relative expertise on the query term will be ranked prominently, thus biasing from the user's perspective the "people/expert" search results based on relative expertise on the query term. Consequently, due to the bias or filter, a search with identical terms may yield different search results for different users. The flowchart 400 ends at block 410 where subject are selected as the search result for the user based on the influence scores and/or the relative expertise of the citing subjects.

One embodiment may be implemented using a conventional general purpose or a specialized digital computer or microprocessor(s) programmed according to the teachings of the present disclosure, as will be apparent to those skilled in the computer art Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A non-transitory machine-readable medium which when executed by a data processing device to perform a method, the method comprising:

receiving a search query from a user;

retrieving a plurality of citations, wherein content from each of the plurality of citations matches the search query and the plurality of citations cites a plurality of objects;

generating a subject list that includes a plurality of subjects, wherein each of the plurality of subjects are connected to the user either directly or indirectly in an influence network of a user;

calculating an influence score for each of the plurality of subjects based at least on a distance on a path from the user to that subject in the influence network and each subject is a representation of a different user in the influence network;

ranking the plurality of objects using a bias filter that includes a ranking function based on at least the influence scores of the subjects of each matching citation, wherein the influence scores are obtained from the user's subject list for those citing subjects that are on the list; and selecting a subset of objects from the ranked plurality of objects as the search results for presentation to the user.

2. The machine-readable medium of claim 1, wherein the method further comprises:

enabling a citation centric search process that focuses on influence of the plurality subjects that cite the plurality of objects.

3. The machine-readable medium of claim 1, wherein the method further comprises:

accepting and enforcing the searching query on citation searching, retrieving and ranking, each of which is either be explicitly described by a user or best guessed by a system based on internal statistical data.

4. The machine-readable medium of claim 1, wherein the method further comprises:

creating the subject list by flattening the user's influence network of subjects up to a given number of degrees, levels, or depth.

5. The machine-readable medium of claim 4, wherein the method further comprises:

calculating the influence score of a subject based on one or more of: influence of the subject on and/or respect from the user and number and length of paths from the subject to the user in the influence network.

6. The machine-readable medium of claim 1, wherein the method further comprises:

assigning a low score to the citation during ranking if a subject of a matching citation does not appear on the user's subject list.

7. The machine-readable medium of claim 1, wherein the method further comprises:

each of the plurality of citations describes an opinion by a subject on an object matching the searching query in the search result.

8. The machine-readable medium of claim 1, wherein the method further comprises:

each of the plurality of citations includes one or more of: expression of opinions on the objects, expressions of authors in the form of Tweets, blog posts, reviews of objects on Internet web sites Wikipedia entries, postings to social media, postings to websites, postings in the form of reviews, recommendations, or any other form of citation made to mailing lists, newsgroups, discussion forums, comments to websites or any other form of Internet publication.

9. A method comprising:

receiving a search query from a user;

retrieving a plurality of citations, wherein content from each of the plurality of citations matches the search query and the plurality of citations cites a plurality of objects;

generating a subject list that includes a plurality of subjects, wherein each of the plurality of subjects are connected to the user either directly or indirectly in an influence network of a user and each subject is a representation of a different user in the influence network;

calculating an influence score for each of the plurality of subjects based at least on a distance on a path from the user to that subject in the influence network and each subject is a representation of a different user in the influence network;

ranking the plurality of objects using a bias filter that includes ranking function based on at least the influence scores of the subjects of each matching citation, wherein the influence scores are obtained from the user's subject list for those citing subjects that are on the list; and selecting a subset of objects from the ranked plurality of objects as the search results for presentation to the user.

10. The method of claim 9, further comprising:

enabling a citation centric search process that focuses on influence of the plurality subjects that cite the plurality of objects.

11. The method of claim 9, further comprising:

accepting and enforcing the searching query on citation searching, retrieving and ranking, each of which is either be explicitly described by a user or best guessed by the system based on internal statistical data.

12. The method of claim 9, further comprising:

creating the subject list by flattening the user's influence network of subjects up to a given number of degrees, levels, or depth.

13. The method of claim 9, further comprising:

calculating the influence score of a subject based on the one or more of: influence of the subject on and/or respect from the user and number and length of paths from the subject to the user in a user's influence network.

14. The method of claim 9, further comprising:

assigning a low score to the citation during ranking if a subject of a matching citation does not appear on the user's subject list.

15. A device comprising:

a processor;

a memory coupled to the processor though a bus; and a process executed from the memory by the processor that causes the processor to receive a search query from a user, retrieve a plurality of citations, wherein content from each of the plurality of citations matches the search query and the plurality of citations cites a plurality of objects, generate a subject list that includes a plurality of subjects, wherein each of the plurality of subjects are connected to the user either directly or indirectly in an influence network of a user, calculate an influence score for each of the plurality of subjects based at least on a distance on a path from the user to that subject in the influence network and each subject is a representation of a different user in the influence network, rank the plurality of objects using a bias filter that includes ranking function based on at least the influence scores of the subjects of each matching citation, wherein the influence scores are obtained from the user's subject list for those citing subjects that are on the list, and select a subset of objects from the ranked plurality of objects as the search results for presentation to the user.

16. The device of claim 15, wherein the process further causes the processor to enable a citation centric search process that focuses on influence of the plurality subjects that cite the plurality of objects.

17. The device of claim 15, wherein the process further causes the processor to accept and enforcing the searching query on citation searching, retrieving and ranking, each of which is either be explicitly described by a user or best guessed by the system based on internal statistical data.

18. The device of claim 15, wherein the process further causes the processor to create the subject list by flattening the user's influence network of subjects up to a given number of degrees, levels, or depth, wherein the user's influence network includes subjects that are connected to the user either directly or indirectly through other sources.

* * * * *